United States Patent
Lowinger et al.

(10) Patent No.: US 11,007,704 B2
(45) Date of Patent: May 18, 2021

(54) ADDITIVE MANUFACTURING OF ELASTOMERIC SEALS FOR REPAIR

(71) Applicant: Eaton Corporation, Cleveland, OH (US)

(72) Inventors: Jeffrey Lowinger, Aurora, MI (US); Kelly A. Williams, South Lyon, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 15/878,683

(22) Filed: Jan. 24, 2018

(65) Prior Publication Data

US 2018/0207861 A1 Jul. 26, 2018

Related U.S. Application Data

(60) Provisional application No. 62/450,090, filed on Jan. 25, 2017.

(51) Int. Cl.
| | |
|---|---|
| *B29C 64/112* | (2017.01) |
| *F16J 1/00* | (2006.01) |
| *F16K 1/20* | (2006.01) |
| *B29C 64/124* | (2017.01) |
| *B29C 64/171* | (2017.01) |
| *B33Y 80/00* | (2015.01) |
| *B33Y 30/00* | (2015.01) |
| *B33Y 50/00* | (2015.01) |
| *F16J 15/328* | (2016.01) |
| *F16J 15/10* | (2006.01) |
| *B33Y 10/00* | (2015.01) |

(52) U.S. Cl.
CPC .......... *B29C 64/112* (2017.08); *B29C 64/124* (2017.08); *B29C 64/171* (2017.08); *F16J 1/00* (2013.01); *F16K 1/2014* (2013.01); *B33Y 10/00* (2014.12); *B33Y 30/00* (2014.12); *B33Y 50/00* (2014.12); *B33Y 80/00* (2014.12)

(58) Field of Classification Search
CPC ... B29C 64/112; B29C 64/124; B29C 64/171; F16J 1/00; F16J 15/328; F16J 15/108; F16K 1/2014; B33Y 10/00; B33Y 30/00; B33Y 50/00; B33Y 80/00
See application file for complete search history.

(56) References Cited

U.S. PATENT DOCUMENTS

| | | | |
|---|---|---|---|
| 7,025,580 B2 * | 4/2006 | Heagy | B29C 63/34 138/108 |
| 2001/0033080 A1 * | 10/2001 | Dukes | F16L 25/0045 285/370 |

(Continued)

*Primary Examiner* — Thomas C Lee
*Assistant Examiner* — Anzuman Sharmin
(74) *Attorney, Agent, or Firm* — Fishman Stewart PLLC

(57) ABSTRACT

A method of modifying or repairing a fluid conduit assembly includes scanning a sealing feature of a fluid conduit, the sealing feature including an abnormality, creating a 3D model of a sealing member configured to provide a fluid seal with the sealing feature, and utilizing the 3D model to form the sealing member via additive manufacturing. The method may include modifying the sealing feature of the fluid conduit to reduce or remove the abnormality and provide the sealing feature with modified dimensions. Scanning the sealing feature may include determining the modified dimensions of the sealing feature.

19 Claims, 6 Drawing Sheets

(56) References Cited

U.S. PATENT DOCUMENTS

| | | | |
|---|---|---|---|
| 2011/0307105 A1* | 12/2011 | Commoner | E21B 43/0122 700/282 |
| 2015/0165684 A1* | 6/2015 | Deane | B33Y 50/02 700/98 |
| 2016/0273687 A1* | 9/2016 | Rubinski | G01L 5/24 |
| 2017/0095332 A1* | 4/2017 | Bruchman | A61L 27/14 |
| 2017/0113450 A1* | 4/2017 | Nass | B33Y 50/00 |
| 2017/0293226 A1* | 10/2017 | Ho | G03F 7/2035 |
| 2017/0363234 A1* | 12/2017 | Britt, Jr. | F16L 17/067 |
| 2017/0368771 A1* | 12/2017 | Harrier | B33Y 10/00 |
| 2018/0010719 A1* | 1/2018 | Kesler | F16L 23/0283 |
| 2018/0195265 A1* | 7/2018 | Hedler | E04H 1/1205 |
| 2018/0259101 A1* | 9/2018 | Lee | F16L 23/02 |

* cited by examiner

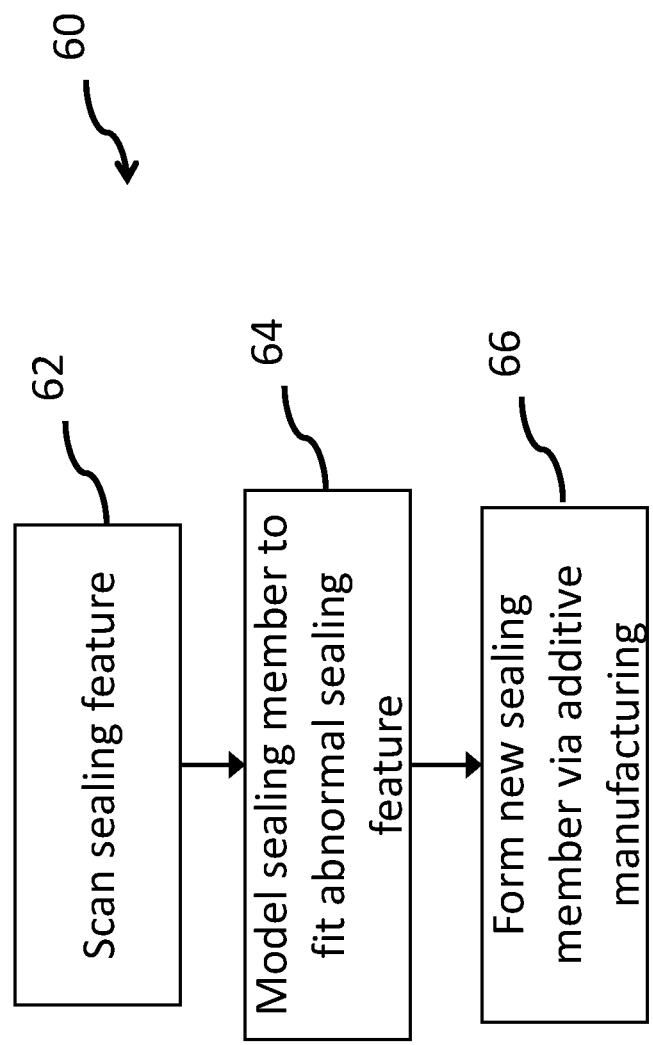

ADDITIVE MANUFACTURING OF ELASTOMERIC SEALS FOR REPAIR

CROSS-REFERENCE TO RELATED APPLICATION

This application claims the benefit of U.S. Provisional Patent Application Ser. No. 62/450,090, filed on Jan. 25, 2017, the disclosure of which is hereby incorporated herein by reference in its entirety.

TECHNICAL FIELD

The present disclosure generally relates to fluid conduits, including fluid conduits suitable for use in aerospace, hydraulic, and/or vehicle applications that may be subject to leakage and loss of pressure due to damage to a sealing mechanism.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Sealing mechanisms may take the form of, for example, an annular sealing member, such as an O-ring, sealingly engaging a surface of a groove or gland in one or more of a male and female fluid conveying component. Loss in sealing may result from damage to the seal material itself, including seal wear or abrasion, or damage to a related sealing surface of a gland or groove. For example and without limitation, seal leakage may be due to damage and/or wear to the sealing surface, such as a metal or polymer groove or gland, or inconsistencies with the manufacture of such surfaces. A damaged or improperly manufactured sealing surface may have wear, nicks, scratches, corrosion, or improper dimensions. A resultant imperfect surface finish may result in a lack of sufficient sealing contact between the sealing surface and the seal member, which may result in a measure of leakage and pressure loss. If this condition occurs, the sealing surface may be reconditioned by machining or polishing to restore the original required tolerances to try to better optimize sealing. If the wear, corrosion, or defects are significant, and cannot be corrected without impacting the dimensional size of the groove or gland (e.g., maximum dimension changes in some cases can, for instance, be less than about 0.05 mm), then the component may often be scrapped and replaced.

There is a desire for solutions/options that minimize or eliminate one or more challenges or shortcomings of seals, fluid conduits, and/or fluid conduit repair methods. The foregoing discussion is intended only to illustrate examples of the present field and should not be taken as a disavowal of scope.

SUMMARY

In embodiments, a method of repairing a fluid conduit assembly may include scanning a sealing feature of a fluid conduit, the sealing feature including an abnormality, creating a 3D model of a sealing member configured to provide a fluid seal with the sealing feature, and/or utilizing the 3D model to form the sealing member via additive manufacturing. The method may include modifying the sealing feature of the fluid conduit to reduce or remove the abnormality and provide the sealing feature with modified dimensions. Scanning the sealing feature may include determining the modified dimensions of the sealing feature.

With embodiments, a fluid conduit assembly may include a fluid conduit including a modified sealing feature and a sealing member formed via additive manufacturing and including dimensions to provide a fluid seal with the modified sealing feature. In embodiments, a sealing member may include a non-round cross section.

In embodiments, a fluid conduit assembly may include a fluid conduit including a sealing feature having an abnormality and a sealing member engaging the abnormality. A sealing member may include one or more features that mirror the abnormality to a provide a fluid seal.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

FIG. 8 is a flow diagram of an embodiment of a method of repairing a fluid conduit according to teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
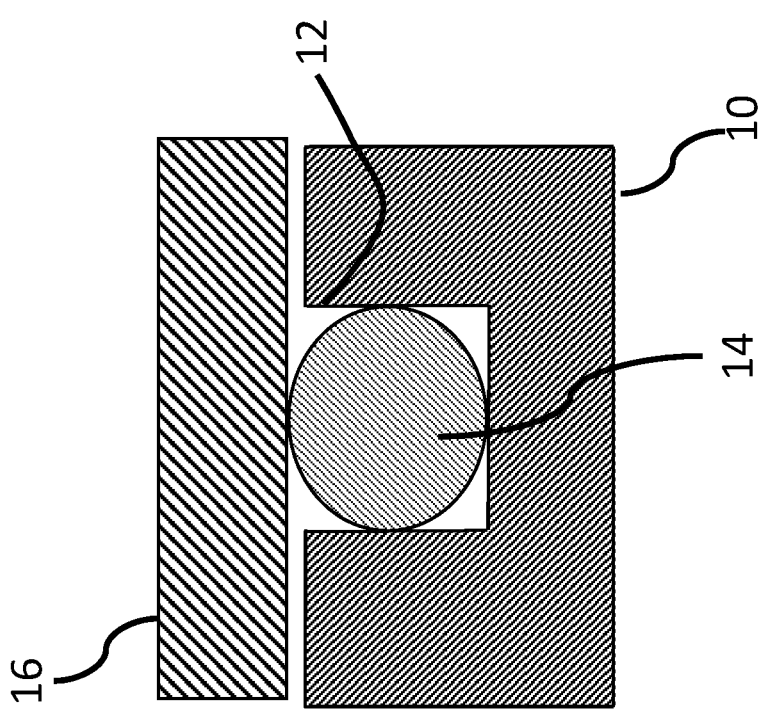
FIG. 1 is a cross-sectional view generally illustrating embodiments of a first fluid conduit, a second fluid conduit, and a sealing member according to teachings of the present disclosure.

In embodiments, such as generally illustrated in FIG. 1, a fluid conduit 10 may include one or more of a variety of shapes, sizes, configurations, and/or materials. For example and without limitation, a fluid conduit 10 may include a fitting (e.g., a metal fitting), a tube, and/or a pipe, among others. A fluid conduit 10 may be connected to or integrated with a machine or actuator, such as a pump, a motor, a transmission, a differential, and/or a valve, among others. A fluid conduit 10 may include one or more sealing features 12, such as a groove or a gland. A sealing feature 12 of a fluid conduit 10 may be configured to receive a sealing member 14 that may provide a fluid seal between the fluid conduit 10 and a second fluid conduit 16. A sealing member 14 may include one or more of a variety of shapes, sizes, configurations, and/or materials. For example and without limitation, a sealing member 14 may include an O-ring and may include at least one of silicone urethane and thermoplastic urethane.

Figure 2:
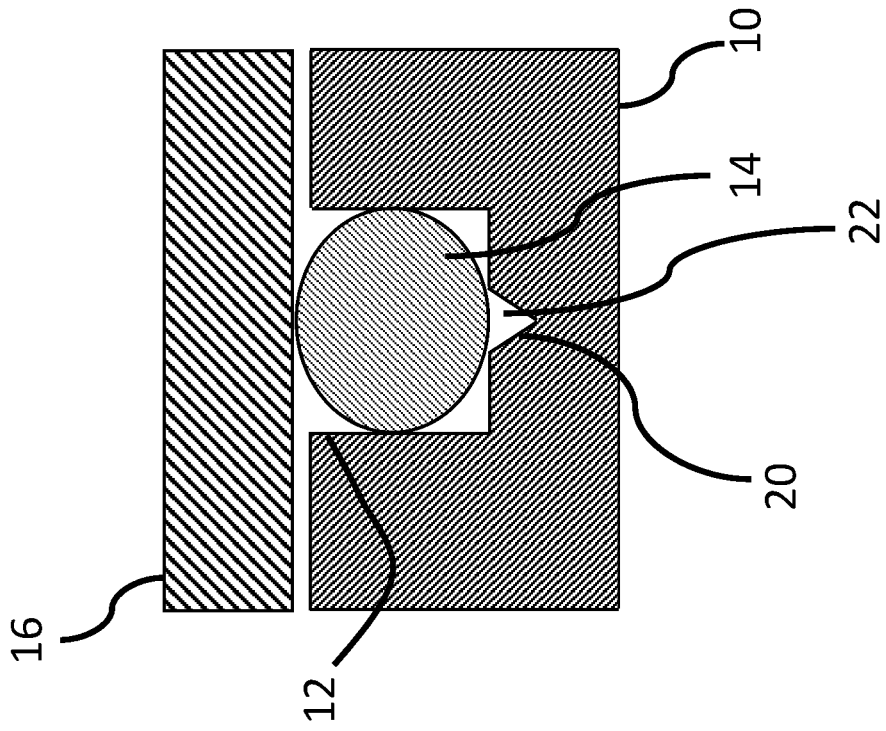
FIG. 2 is a cross-sectional view generally illustrating embodiments of a first fluid conduit with an abnormality, a second fluid conduit, and a sealing member according to teachings of the present disclosure.

In some circumstances, such as generally illustrated in FIG. 2, a sealing feature 12 of a fluid conduit 10 may include one or more abnormalities 20, such as an imperfection, debris, a manufacturing defect, and/or damage. Such abnormalities may prevent or impede a proper seal between a fluid conduit 10, a sealing member 14, and a second fluid conduit 16 and/or may open a leak path 22.

With embodiments, such as generally illustrated in FIGS. 3, 4, 5, and 6, a method 30 of repairing a fluid conduit 10 may include determining that a fluid conduit 10 includes an abnormality 20 that may impair sealing, such as with a second fluid conduit 16 (step 32). The fluid conduit 10 may be modified, such as via reconditioning, machining, and/or grinding, to provide a modified sealing feature 12' with an improved (e.g., smooth) sealing surface that may mitigate or eliminate the effects of the abnormality 20 (step 34). Modifications may include removing material (e.g., via machining or grinding) from and/or adding material (e.g., via welding additional metal) to the fluid conduit 10. As a potential result of the modification, dimensions of the modified sealing feature 12' of the fluid conduit 10 may be modified (e.g., increased) compared to the original version of the sealing feature 12. If the original sealing member 14 is disposed in the modified sealing feature 12' (see, e.g., FIG. 3), the sealing member 14 may not provide sufficient fluid sealing between the fluid conduit 10 and the second fluid conduit 16 and/or one or more leak paths 22 may be created.

Figure 4:
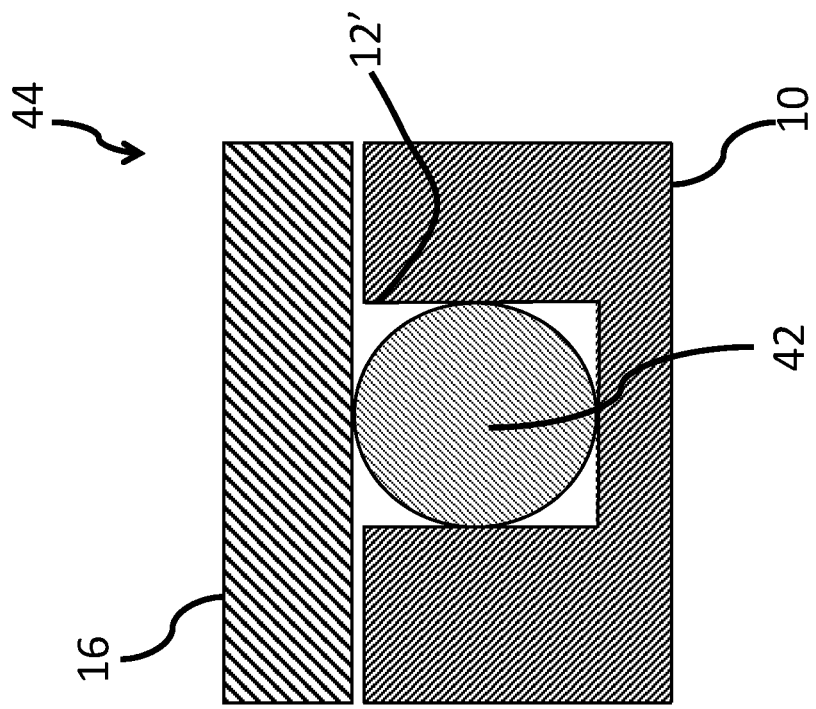
FIG. 4 is a cross-sectional view generally illustrating embodiments of a first fluid conduit with a modified sealing feature, a second fluid conduit, and a new sealing member according to teachings of the present disclosure.
Figure 3:
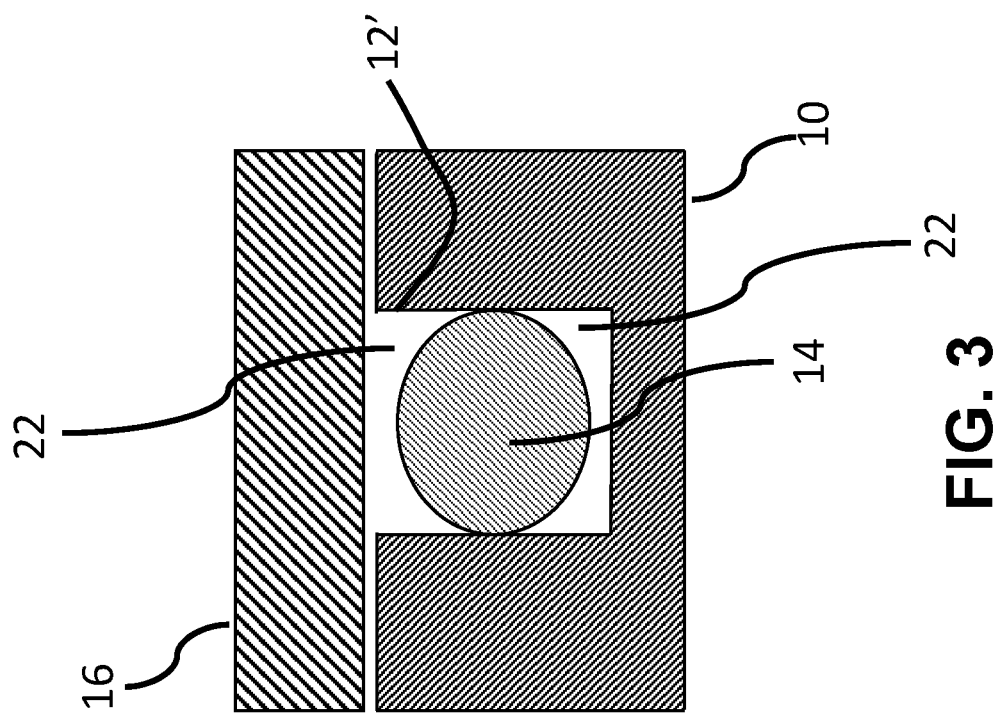
FIG. 3 is a cross-sectional view generally illustrating embodiments of a first fluid conduit with a modified sealing feature, a second fluid conduit, and a sealing member according to teachings of the present disclosure.
Figure 5:
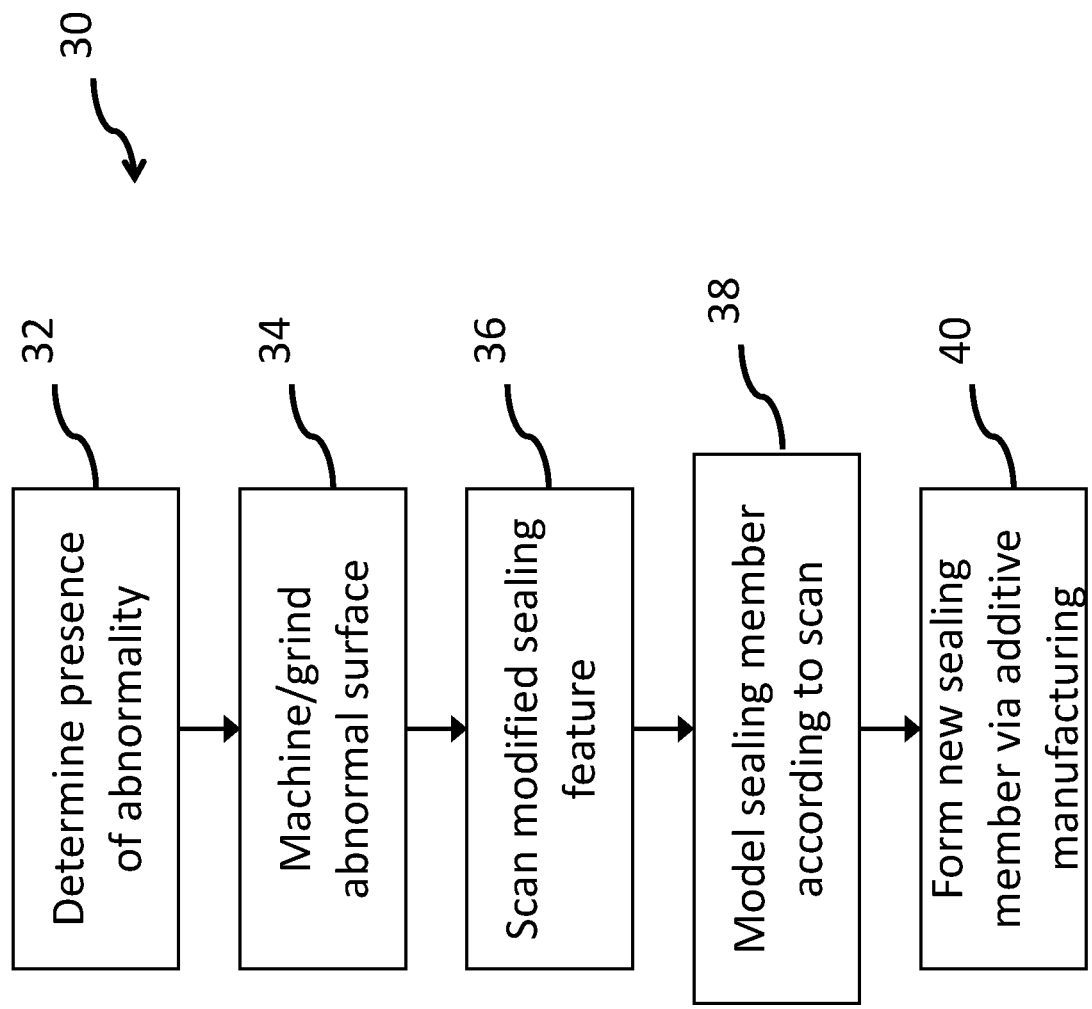
FIG. 5 is a flow diagram of an embodiment of a method of repairing a fluid conduit according to teachings of the present disclosure.
Figure 6:
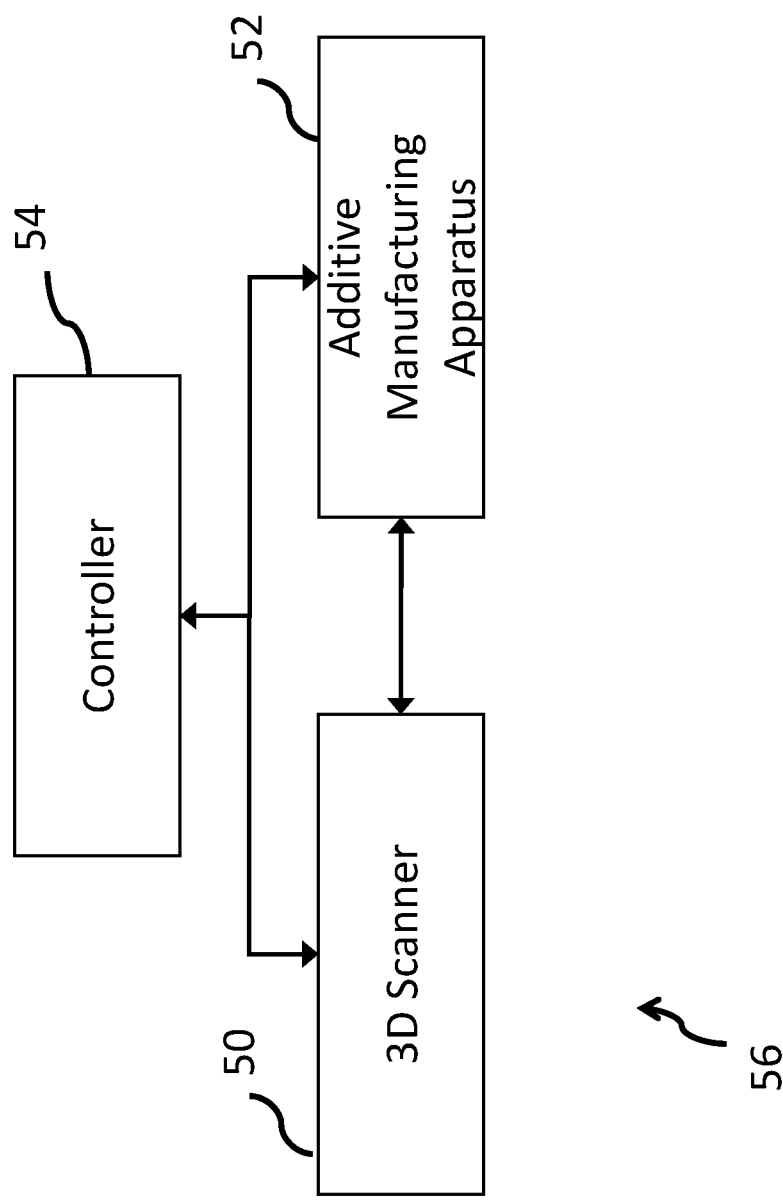
FIG. 6 is a schematic view of an embodiment of a fluid conduit repair system according to teachings of the present disclosure.

In embodiments, such as generally illustrated in FIG. 4, a new sealing member 42 may be utilized in connection with the modified sealing feature 12'. A scanner or inspection apparatus 50, such as generally illustrated in FIG. 6, may be utilized to obtain a three-dimensional or 3D scan of the modified sealing feature (step 36). The resolution of the scan may, for example and without limitation, be about 0.01 mm. One example of a scanner 50 that may be utilized to obtain the scan may include a CyberGage360™ 3D Scanning System, but there are other apparatus and manufacturers of scanners 50 having similar capability that may be utilized. The scan may be automated and may be obtained without contacting the fluid conduit 10.

In embodiments, the scan may be utilized to produce an output model (e.g., a 3D computer aided design or CAD model) for a new sealing member 42 (step 38). The output model may include the new dimensions of the modified sealing feature 12' of the fluid conduit 10. The new dimensions may not match with any readily available sealing members and/or a relatively small number of sealing member sizes may be available. As an alternative to using an existing sealing member and/or adding new material to the existing fluid conduit 10 (e.g., via welding), the dimensions of the modified sealing feature 12' that may be obtained via scanning may be used to form a new sealing member 42, such as an O-ring, that may provide better sealing characteristics in connection with the modified sealing feature 12' (step 40). With embodiments, the new sealing member 42 may include different dimensions than the original sealing member 14. For example and without limitation, the original sealing member 14 may include a substantially round cross section (e.g., viewed from a circumferential direction) and the new sealing member 42 may include a less round or non-round cross-section and/or an oval-shaped cross-section. With some embodiments, the new sealing member 42 may include a greater width (e.g., in an axial direction) and/or a greater thickness (e.g., in a radial direction), compared to the original sealing member 14 (e.g., a new sealing member 42 may be elongated in at least one direction).

With embodiments, a new sealing member 42 may be formed via additive manufacturing and/or an additive manufacturing apparatus 52, such as generally illustrated in FIG. 6. For example and without limitation, the output model may be transmitted to an additive manufacturing apparatus 54 (e.g., a printer) that may be configured to print and/or form a new sealing member 42 for the modified sealing feature 12'. Additive manufacturing technologies that may be utilized include, without limitation, stereolithography (SLA). SLA may include utilizing photopolymerization or curing of a polymer using ultraviolet (UV) light that may cause linkage or cross-linking of the polymer molecules to form a solid part. In an embodiment, an acrylic-based, photo-curing polymer with properties comparable to silicone elastomers may be utilized to form a new sealing member 42. A fluid conduit assembly 44 may include a fluid conduit 10 having a modified sealing feature 12', a second fluid conduit 16, and/or a sealing member 42.

In embodiments, such as generally illustrated in FIG. 6, a fluid conduit repair system 56 may include a scanner 50, an additive manufacturing apparatus 52, and/or a controller 54. A controller 54 may be configured to control operation of and/or communication between a scanner 50 and an additive manufacturing apparatus 52. The controller 54 may be connected to or integrated with the scanner 50 and/or the additive manufacturing apparatus 52. With embodiments, a controller 54 may include an electronic controller and/or include an electronic processor, such as a programmable microprocessor and/or microcontroller. In embodiments, a controller may include, for example, an application specific integrated circuit (ASIC). A controller may include a central processing unit (CPU), a memory, and/or an input/output (I/O) interface. A controller may be configured to perform various functions, including those described in greater detail herein, with appropriate programming instructions and/or code embodied in software, hardware, and/or other medium. In embodiments, a controller may include a plurality of controllers. In embodiments, a controller may be connected to a display, such as a touchscreen display.

Figure 7:
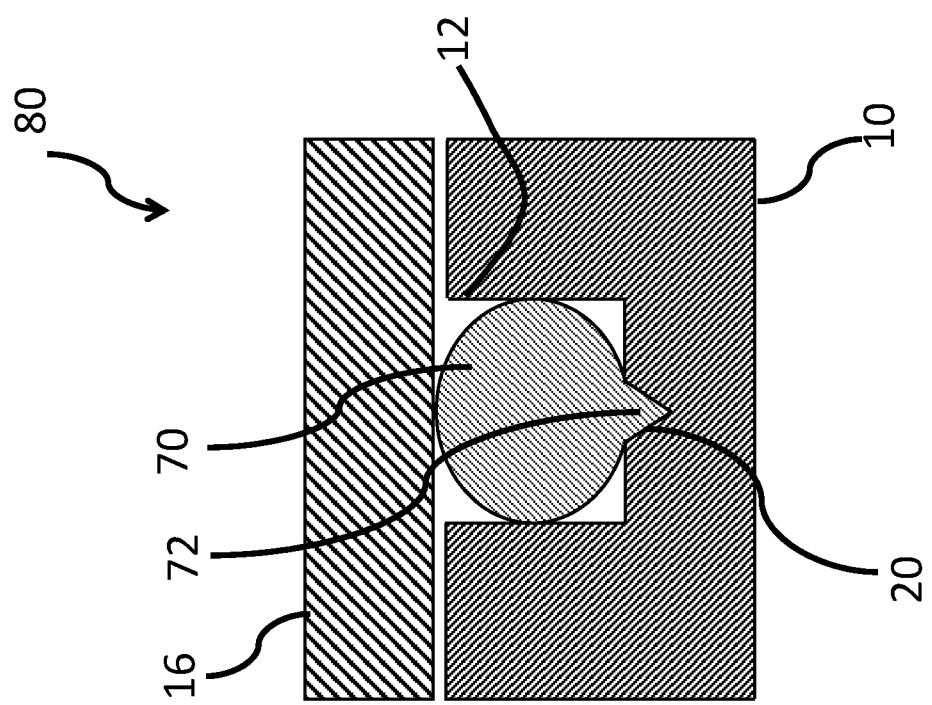
FIG. 7 is a cross-sectional view generally illustrating embodiments of a first fluid conduit, a second fluid conduit, and a new sealing member according to teachings of the present disclosure.

With embodiments, such as generally illustrated in FIGS. 7 and 8, a method 60 of repairing a fluid conduit 10 may include scanning a sealing feature 12 of a fluid conduit 10 (step 62). The scan may be conducted in the same or a similar fashion as described in connection with step 36 of method 30. For example and without limitation, a 3D scan of the fluid conduit 10 may be obtained without contacting the fluid conduit 10. The 3D scan including scanning one or more sealing surfaces of the sealing feature 12 to model one or more abnormalities 20. The 3D scan may be utilized to create a model (e.g., a CAD model) of a new sealing member 70 (step 64). The model may be used in a native form and/or may be modified to provide an enhanced 3D model of a new sealing member 70. The output model may include substantially an inverse or a mirror image of the abnormality or abnormalities 20 of the sealing feature 12, such as, for example and without limitation, dimensional imperfections and/or all nicks, scratches, and wear. The output model may be transmitted to an additive manufacturing apparatus 52 that may be configured to form and/or print a new sealing member 70 with an appropriate sealing material, such as an elastomer (step 66). A new sealing member 70 may include and/or be formed with one or more protrusions or recesses 72 that may correspond to and/or engage one or more abnormalities 20 of a sealing feature 12. A fluid conduit assembly 80 may include a fluid conduit 10 having a sealing feature 12, a second fluid conduit 16, and/or a sealing member 70. In embodiments, method 60 may not include any reconditioning or modification of a sealing feature 12 and/or may include less reconditioning or modification than method 30.

In embodiments, method 30 and method 60 may be utilized depending on expected operation conditions of a fluid conduit assembly 44, 80. For example and without limitation, if a sealing member is expected to move during operation, method 30 may be utilized to form a new sealing member (e.g., sealing member 42) and/or if a sealing member is not expected to move during operation, method 60 may be utilized to form a new sealing member (e.g., sealing member 70).

With embodiments, a method of repairing a fluid conduit 10 (e.g., method 30 or method 60) may be repeated for one or more additional or different fluid conduits. A resulting sealing member (e.g., a second sealing member or subsequent sealing members) may include a different configuration than sealing members 42, 70. With embodiments, repair methods 30, 60 may be configured to form sealing members with hundreds, thousands, or even more different configurations.

In embodiments, a method of repairing a fluid conduit (e.g., method 30 or method 60) may include forming a new sealing member 42, 70 via additive manufacturing. Depending on the geometry of the fluid conduit 10 and the accessibility of the sealing feature 12, the sealing member 42, 70 may be formed in situ (e.g., directly in the sealing feature 12) or may be formed separately and subsequently assembled with the fluid conduit 10. Once formed, the additively manufactured sealing member 42, 70 may be custom fit to a modified sealing feature 12' or an abnormal sealing feature 12 to compensate for some or all of the modification or abnormalities of the sealing feature 12', 12 to provide a suitable fluid seal (e.g., between the fluid conduit 10 and the second fluid conduit 16).

While some fluid conduit design techniques may effectively design a sealing feature 12 of a fluid conduit 10 to fit with available sealing members, embodiments of methods and systems disclosed herein may facilitate designing sealing members to fit with sealing features of fluid conduits. In embodiments, methods 30, 60 may not include adding material to a fluid conduit 10.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

It is intended that all matter contained in the above description or shown in the accompanying drawings shall be interpreted as illustrative only and not limiting. Changes in detail or structure may be made without departing from the present disclosure.

It should be understood that an electronic control unit (ECU), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having both ROM, RAM, a combination of non-volatile and volatile (modifiable) memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute one or more processors, multiple processors that are integrated into a single system or are distributed over and connected together through a communications network, and/or where the network may be wired or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A method of modifying or repairing a fluid conduit assembly having a fluid conduit, a second fluid conduit, and an original sealing member received in a sealing feature of the fluid conduit and providing a seal between the fluid conduit and the second fluid conduit, the method comprising:
    determining that the sealing feature has an abnormality that at least one of (i) impedes the seal by the original sealing member between the fluid conduit and a second fluid conduit, and (ii) forms a leak path;
    modifying the sealing feature to reduce or remove the abnormality, resulting in modified dimensions of the sealing feature;
    scanning the sealing feature with the modified dimensions;
    creating a 3D model of a modified sealing member to be used in place of the original sealing member, the modified sealing member configured to provide a fluid seal with the sealing feature with the modified dimensions; and
    utilizing the 3D model to form the modified sealing member via additive manufacturing.

2. The method of claim 1, wherein scanning the sealing feature includes determining the modified dimensions of the sealing feature.

3. The method of claim 2, wherein the 3D model of the modified sealing member corresponds to the modified dimensions of the sealing feature.

4. The method of claim 2, wherein the modified sealing member includes dimensions that correspond to the modified dimensions of the sealing feature.

5. The method of claim 4, wherein the sealing member is non-round.

6. The method of claim 1, wherein modifying the sealing feature includes at least one of machining and grinding.

7. The method of claim 1, wherein the modified sealing member is elongated in at least one direction.

8. The method of claim 1, wherein the sealing feature includes at least one of a gland and a recess.

9. The method of claim 1, wherein additive manufacturing includes stereolithography.

10. The method of claim 1, wherein the modified sealing member is formed at least partially from an acrylic-based photo-curing polymer.

11. The method of claim 10, wherein the acrylic-based photo-curing polymer is a silicone elastomer.

12. The method of claim 1, wherein the modified sealing member includes at least one of silicone urethane and thermoplastic urethane.

13. The method of claim 1, wherein the 3D model of the modified sealing member includes one or more features that mirror the abnormality.

14. The method of claim 1, wherein the modified sealing member includes one or more features that mirror the abnormality.

15. The method of claim 1, including
    scanning a sealing feature of a different fluid conduit, the sealing feature including an abnormality;
    creating a 3D model of a second modified sealing member configured to provide a fluid seal with the sealing feature of the different fluid conduit; and
    utilizing the 3D model to form the second modified sealing member via additive manufacturing;
    wherein the second modified sealing member is different from the modified sealing member.

16. The method of claim 1, wherein material is not added to the fluid conduit.

17. The method of claim 4,
    wherein the sealing member includes an oval-shaped cross section.

18. The method of claim 1, including determining if the modified sealing member will move during operation; wherein the 3D model of the modified sealing member includes one or more features that mirror the abnormality if the sealing member will not move during operation; and the 3D model of the modified sealing member includes dimensions corresponding to modified dimensions of the sealing feature if the modified sealing member will move during operation.

19. A method of modifying or repairing a fluid conduit assembly, comprising:
    scanning a sealing feature;
    creating a 3D model of a modified sealing member to be used in place of the original sealing member, the modified sealing member configured to provide a fluid seal with the sealing feature;
    utilizing the 3D model to form the modified sealing member via additive manufacturing; and
    determining if the modified sealing member will move during operation; wherein the 3D model of the modified sealing member includes one or more features that mirror the abnormality if the sealing member will not move during operation; and the 3D model of the modified sealing member includes dimensions corresponding to modified dimensions of the sealing feature if the modified sealing member will move during operation.

* * * * *